United States Patent [19]
Riese

[11] Patent Number: 4,864,980
[45] Date of Patent: Sep. 12, 1989

[54] EXHAUST VALVE THROTTLING MECHANISM FOR TWO-STROKE ENGINE

[75] Inventor: Stephen B. Riese, Fond du Lac, Wis.

[73] Assignee: Brunswick Corporation, Skokie, Ill.

[21] Appl. No.: 115,701

[22] Filed: Nov. 2, 1987

[51] Int. Cl.⁴ .................................. F02B 75/02
[52] U.S. Cl. ........................ 123/65 PE; 123/190 A
[58] Field of Search .......... 123/65 PE, 65 V, 65 EM, 123/735 C, 52 M, 190 R, 190 A

[56] References Cited

U.S. PATENT DOCUMENTS

| | | | |
|---|---|---|---|
| 1,635,963 | 7/1929 | Seifert | 123/190 A |
| 1,997,491 | 4/1935 | Kemp | 123/190 A |
| 2,164,167 | 6/1939 | Schneider | 123/65 |
| 2,403,844 | 7/1946 | Bolli | 123/65 |
| 2,798,466 | 7/1957 | Rzepecki | 123/65 |
| 3,367,311 | 2/1968 | Tenney | 123/65 |
| 4,121,552 | 10/1978 | Mithuo | 123/65 |
| 4,187,809 | 2/1980 | Lanpheer | 123/65 |
| 4,285,311 | 8/1981 | Iio | 123/323 |
| 4,321,893 | 3/1982 | Yamamoto | 123/65 |
| 4,325,335 | 4/1982 | Shibata | 123/323 |
| 4,333,431 | 6/1982 | Iio | 123/323 |
| 4,341,188 | 7/1982 | Nerstrom | 123/324 |
| 4,364,346 | 12/1982 | Shiohara | 123/323 |
| 4,368,703 | 1/1983 | Shibata | 123/65 |
| 4,388,894 | 6/1983 | Tanaka | 123/65 |
| 4,397,272 | 8/1983 | Omote | 123/179 |
| 4,516,540 | 5/1985 | Nerstrom | 123/65 |
| 4,541,371 | 9/1985 | Kageyama et al. | 123/190 A |
| 4,570,439 | 2/1986 | Uchinishi | 60/314 |
| 4,621,596 | 11/1986 | Uchinishi | 123/65 |
| 4,622,928 | 11/1986 | Uchinishi | 123/65 |
| 4,776,306 | 10/1988 | Matsuura et al. | 123/190 A |

FOREIGN PATENT DOCUMENTS 914498 10/1946 France .
842337 7/1960 United Kingdom .

OTHER PUBLICATIONS

SAE Technical Paper Series, "Emission Control of Two-Stroke Motorcycle Engines by the Butterflye Exhaust Valve", Tsuchiya et al., Sep. 8-11, 1980.

Primary Examiner—David A. Okonsky
Attorney, Agent, or Firm—Robert C. Curfiss

[57] ABSTRACT

An improved exhaust port throttling mechanism for a two-stroke engine. The engine includes a plurality of in-line cylinders each having an exhaust passage disposed to be closed during reciprocating movement of the piston. The exhaust passages communicate with a common exhaust chamber and a tubular valve member is mounted for rotation within the exhaust chamber. The valve member includes a plurality of apertures, each adapted to register with one of the exhaust passages. When used with a V-6 engine having two banks of in-line cylinders, a shaft is connected to each valve member and the corresponding ends of the shafts are interconnected by meshing gear segments. One of the gear segments is connected through a linkage to the throttle lever for the engine so that the valve members will be rotated by actuation of the throttle lever between a substantially closed position at low speeds, where the valve members substantially close off the exhaust passages, to an open position at high speeds where the apertures in the valve members are in full registry with the exhaust passages, so that the exhaust gas is discharged via the interior of the valve members without restriction.

15 Claims, 2 Drawing Sheets

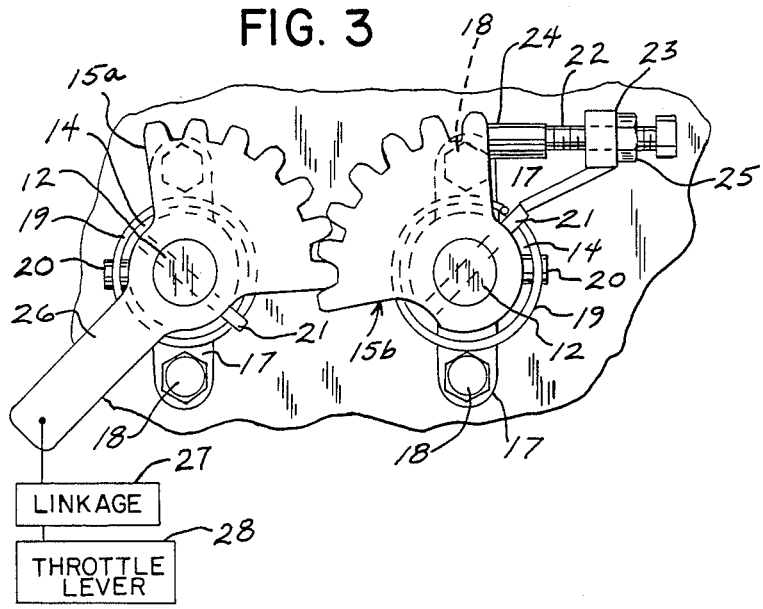
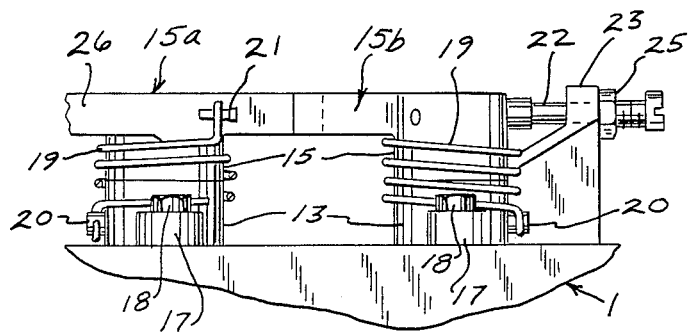
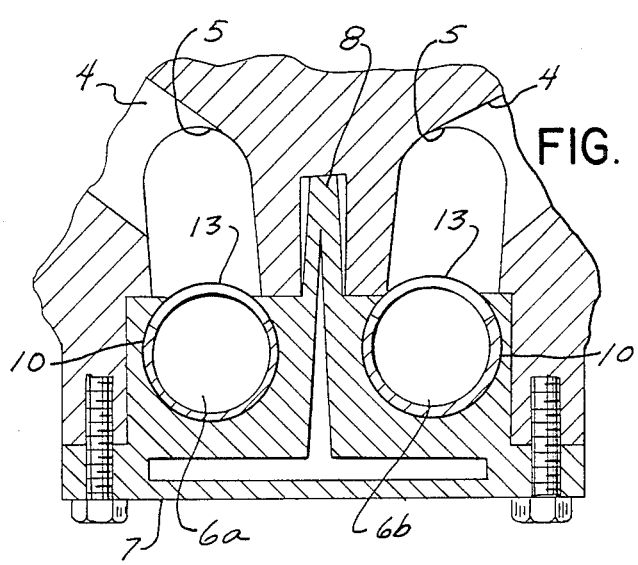
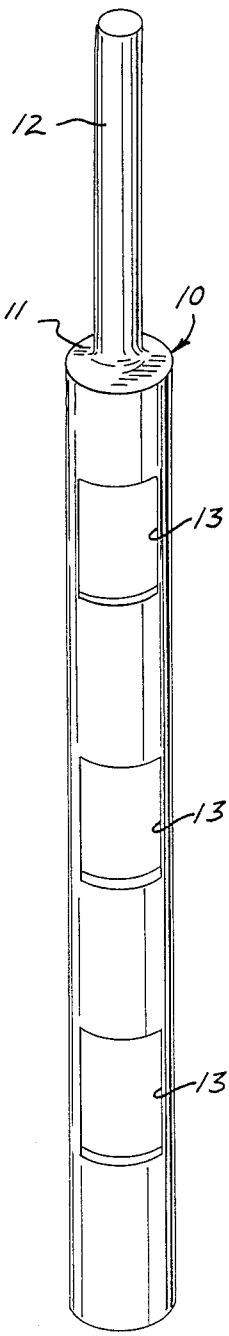

EXHAUST VALVE THROTTLING MECHANISM FOR TWO-STROKE ENGINE

BACKGROUND OF THE INVENTION

Two-stroke engines include an exhaust port in the cylinder wall, which is opened and closed as the piston reciprocates in the cylinder. It has been recognized that in multiple cylinder two-stroke engines reflected pressure fluctuations under idle or low speed conditions can adversely effect the combustion. At low or idle speeds, the pressure waves are not normally tuned so that reflected pressure waves from other cylinders in the bank, or from the same cylinder, can have an adverse effect on the engine combustion.

In view of this, it has been proposed to utilize a butterfly valve in the exhaust port of a two-stroke motorcycle engine and control the operation of the valve through the intake manifold vacuum as disclosed in "Emission Control Of Two-Stroke Motor Cycle Engines By The Butterfly Exhaust Valve", *Society of Automotive Engineers Inc.*, Sept. 8–11, 1980.

U.S. Pat. application Ser. No. 07/064,195, filed June 19, 1987, also discloses an exhaust valve throttling mechanism for a two-stroke engine which can be incorporated with a multiple cylinder engine, such as a V-6 marine engine employing two banks of three in-line cylinders. In accordance with the invention of that patent application, the engine block is provided with a pair of openings or passages, each of which intersects the exhaust ports of a bank of cylinders and a shaft is mounted for rotation with each passage and carries a plurality of shutters or valve members, each of which is mounted within one of the exhaust ports. Advancement of the throttle will operate through a linkage to rotate the shafts to move the valves toward the open position. Conversely, a reduction of engine speed will act to move the valve members toward the closed position where the valve members will act to substantially block or restrict the propagation of pressure waves back to the cylinders at low and idle speeds.

SUMMARY OF THE INVENTION

The invention is directed to an improved exhaust valve throttling mechanism for a two-stroke engine and has particular application to a multiple cylinder engine, such as a V-6 marine engine employing two banks of three in-line cylinders.

An exhaust passage communicates with each cylinder and the exhaust passages in each bank of cylinders are connected to a common exhaust chamber. Mounted for rotation within the exhaust chamber is a hollow tubular valve member having a plurality of apertures adapted to register with the respective exhaust passages. The valve member is adapted to be rotated between a closed position at low or idle speeds, where the apertures are substantially out of registry with the respective exhaust passages, to an open position at high speeds where the apertures are in full registry with the exhaust passages and the exhaust gas will pass from the passages into the interior of the valve member without restriction and then be discharged from the valve member to the exterior.

When used with a V-6 engine having two banks of in-line cylinders, a shaft is connected to each tubular valve member and the corresponding ends of the shafts are interconnected by meshing gear segments. One of the gear segments is connected through a linkage to the throttle lever for the engine, so that the valve members will be rotated by actuation of the throttle lever between a substantially closed position at low speeds, where the valve members will substantially block the exhaust passages, to an open position at high speeds where the apertures in the valve members are in full registry with the corresponding exhaust passages.

A biasing mechanism can be incorporated with the gear segments to bias the valve members to a closed position, and an adjusting mechanism can also be employed to manually adjust the closed position of the valve members.

The exhaust valve throttling mechanism of the invention substantially improves the performance of the engine by providing quiet operation, better fuel economy and smoother running at low speeds. In addition, the invention decreases hydrocarbon emissions and reduces engine surge that results from the irregular combustion inherent in a two-stroke engine.

As the rotary valve members do not restrict or block the exhaust passages at high speeds, there is no power loss as occurs in prior systems in which the throttling valve partially restricts the exhaust passages at full throttle.

Other objects and advantages will appear in the course of the following description.

DESCRIPTION OF THE DRAWINGS

The drawings illustrate the best mode presently contemplated of carrying out the invention.

In the drawings:

FIG. 2 is a section taken along line 2—2 of FIG. 1;

FIG. 3 is a top plan view showing the mating gear segments;

FIG. 4 is an enlarged fragmentary elevational view showing the gear segments and the biasing mechanism;

FIG. 6 is a perspective view of one of the rotary valve members.

DESCRIPTION OF THE ILLUSTRATED EMBODIMENT

Figure 1:
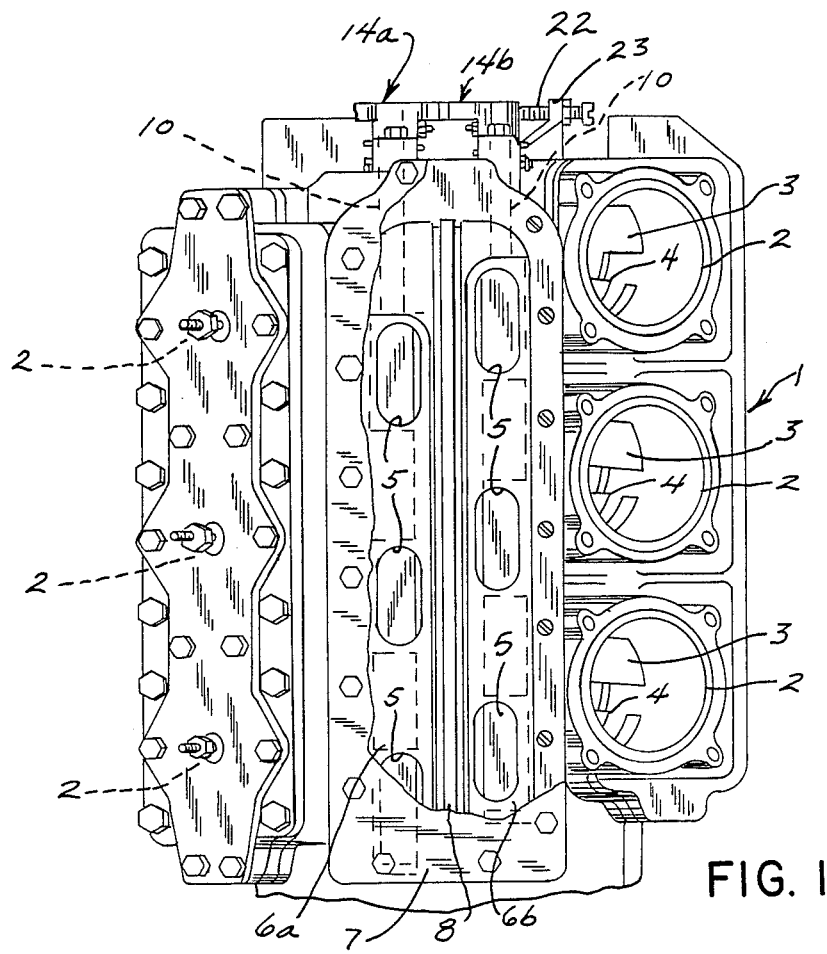
FIG. 1 is an elevational view partly in section of a six cylinder outboard motor engine incorporating the exhaust valve throttling system of the invention.

The drawings illustrate a portion of an outboard motor powerhead having a two-stroke, six cylinder engine, such as that disclosed in U.S. Patent No. 4,187,809. The engine block 1 is provided with two banks of three cylinders 2 in a vertical in-line arrangement. Each of the cylinders 2 includes an air-fuel intake port 3 and an exhaust port 4. As best shown in FIG. 2, each exhaust port 4 communicates with an exhaust passage 5 and the exhaust passages 5 of each of the banks of cylinders 2 register with exhaust chambers 6a and 6b. A cover assembly 7 is connected to the engine block and encloses the exhaust chambers 6a and 6b, while an exhaust cavity separator 8, that is formed integrally with cover assembly 7 separates the two chambers.

As best shown in FIG. 2, exhaust chambers 6a and 6b are partially cylindrical in cross section and the lower end of each exhaust chamber 6a, 6b is connected to an exhaust discharge passage 9, formed in the block 1.

Mounted for rotation within each exhaust chamber 6a, 6b is a tubular valve member 10. The upper end of each valve member 10 is enclosed by a cap 11 and an axial shaft 12 projects upwardly from the cap 11 and is journalled within an opening in the block 1.

Figure 5:
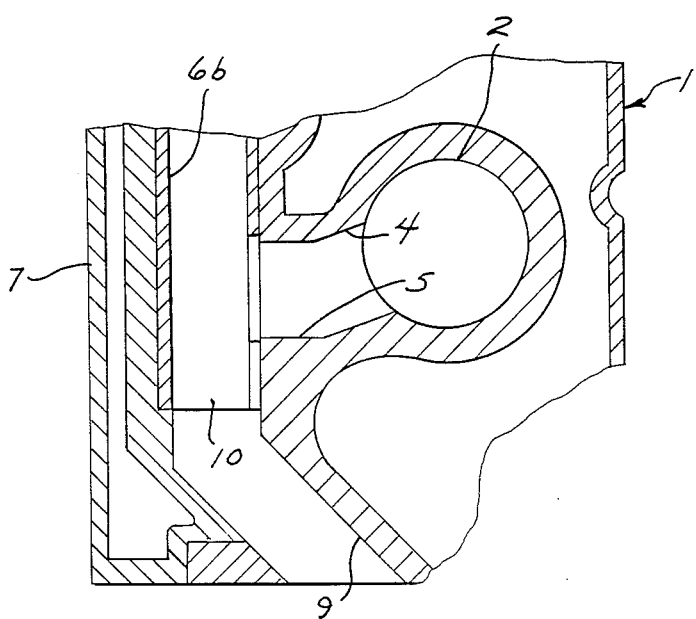
FIG. 5 is a longitudinal section through a bank of cylinders showing the rotary valve member.

As best shown in FIG. 5, the lower end of each valve member 10 is open and communicates with the respective discharge passage 9.

Each valve member 10 is provided with a plurality of apertures 13, each of which is adapted to register with one of the exhaust passages 5. Through rotation of the valve member 10, apertures 13 can be moved from an open position, where the apertures are in full registry with the exhaust passages 5, to a closed position where the apertures are substantially out of registry and act to block the exhaust passages 5.

As illustrated, apertures 13 extend through an arc of approximately 160° to 170°, but this of course depends on the diameter of the tube and the cross sectional area of the exhaust passages. It is, of course, important that the area of the apertures 13 be equal to, or greater, than the cross sectional area of the exhaust passages 5, so that when the valve members are in the open position, there will be no restriction to gas flow from the exhaust passages into the interior of the valve members.

In the closed position, apertures 13 are substantially out of registry with exhaust ports 5. In practice, about 85% to 95% of the area of the passages 5 will be blocked off by the valve members 10. Alternately, valve members 10 can be provided with one or more small holes, separate from the apertures 13, so that when the valve members are in the closed position, the small holes will register with the exhaust passages 5. Thus, at low or idle speed the valve members 10 will substantially block or restrict the propagation of pressure waves back to the cylinders.

The term "closed position", as used in the description and claims, is intended to cover a condition where the valve members 10 do not completely close off the exhaust passages 5.

Valve members 10 are moved between the closed and open positions in accordance with engine speed. In this regard, the upper end of each shaft 12 extends through a collar or boss 14 on block 1 and carries a gear segment 15. As best shown in FIG. 3, the gear segments 15a and 15b each include a central hub 16, which is mounted on the end of the corresponding shaft 12, and a plurality of meshing gear teeth.

Arms 17 extend outwardly from opposite sides of each hub 16 and are connected to block 1 through bolts 18.

Valve members 10 are biased to a closed position and to provide this biasing action, a torsion spring 19 is disposed around each of the hubs 16. One end of each torsion spring is engaged with a lug 20 on boss 14, while the opposite end of the torsion spring is engaged with a pin 21 on the respective gear segment 15. The force of torsion springs 19 will thus bias the gear segments 15 and shafts 12 in a direction such that on termination of operation of the engine the valve members 10 will be returned to the closed position.

The invention can also include a mechanism for adjusting the closed position of valve members 10. In this regard, an adjusting screw 22 is threaded within a bracket 23 that extends upwardly from block 1 and the end 24 of screw 22 is engaged with the peripheral edge of gear segment 15b. Lock nut 25 is threaded onto screw 22 and bears against bracket 23. By adjustment of screw 22, the closed position of the valve members 10 can be controlled to obtain the optimum exhaust opening at idle speed.

Valve members 10 are moved between the closed and open positions in accordance with operation of the engine throttle. To provide this operation, an arm 26 extends outwardly from the hub 16 of gear segment 15a and the arm is connected through a suitable linkage 27 to the throttle lever 28 for the engine. As the throttle lever 28 is advanced toward full engine speed, the valve members 10 will be rotated toward the open position, against the force of torsion springs 19, and conversely, as the throttle lever is moved toward idle speed, the valve members will be moved toward the closed position so that the valve members will substantially block the reflection of pressure waves back to the cylinders.

Linkage 27 and throttle lever 28 are shown diagrammatically and may take various forms depending upon the nature and location of the throttle of the marine craft. In general, the movement of the valve members 10 is proportional to movement of the throttle lever 28 and can be calibrated for each type of engine.

The invention provides a simple and effective exhaust valve throttling mechanism for engines incorporating a plurality of in-line cylinders. While the above description has shown the mechanism as utilized with a V-6 engine employing two banks of three cylinders each, it is contemplated that the invention can be used with any engine having a plurality of in-line cylinders.

The exhaust valve throttling mechanism prevents the propagation of pressure fluctuated waves back to the cylinders at low and idle speeds and thus substantially improves engine performance, producing a quieter and smoother running engine at low speeds, as well as increasing fuel economy and reducing engine surge. At high speeds the exhaust valve throttling mechanism does not interfere or restrict the exhaust passages so that the mechanism does not reduce the power output at full throttle.

While the description and drawings have illustrated the valve members 10 being rotated between the open and closed positions, it is contemplated that the valve members could be moved axially or with a combination of axial and rotational movement.

Various modes of carrying out the invention are contemplated as being within the scope of the following claims particularly pointing out and distinctly claiming the subject matter which is regarded as the invention.

I claim:

1. In a two-stroke engine an engine block having a plurality of in-line cylinders, exhaust passage means communicating with each cylinder, a tubular valve member mounted for rotation relative to said block and having a plurality of apertures constructed and arranged to be moved into and out of registry with the respective exhaust passage means, and operating means for moving said valve member from a closed position at low engine speeds where said apertures are substantially out of registry with the respective exhaust passage means to an open position at high speeds wherein said apertures are in full registry with said exhaust passage means, the interior of said tubular valve member constituting a conduit to conduct exhaust gas.

2. The engine of claim 1, wherein said operating means is constructed and arranged to rotate said valve member between the open and closed positions.

3. The engine of claim 1, wherein said block includes three in-line cylinders.

4. The engine of claim 1, and including adjusting means for adjusting the position of said valve member when in said closed position.

5. The engine of claim 1, wherein said operating means comprises throttle means for controlling the speed of said engine, and connecting means for connecting said throttle means to said valve member, said connecting means being constructed and arranged to move said valve member toward an open position on an increase of engine speed.

6. The engine of claim 1, wherein said tubular valve member has discharge means separate from said apertures for discharging said exhaust gas.

7. The engine of claim 1, wherein each aperture has an area at least as great as the cross-sectional area of the respective exhaust passage means.

8. In a two-stroke engine, an engine block having a plurality of in-line cylinders, each cylinder having exhaust passage means, exhaust chamber means disposed in said block and communicating with said exhaust passage means, tubular valve means mounted for rotation in said exhaust chamber means and having a plurality of apertures constructed and arranged to be moved into and out of registry with the respective exhaust passage means, and means responsive to an increase in engine speed for rotating said tubular valve means from a first position where said apertures are substantially out of registry with the corresponding exhaust passage means to a second position where said apertures are in full registry with the respective exhaust passage means, the interior of said tubular valve means constituting a conduit to conduct exhaust gas.

9. The engine of claim 8, wherein the area of each aperture is at least as great as the cross-sectional area of the corresponding exhaust passage means to prevent restriction of said exhaust passage means at high speed.

10. In a two-stroke six cylinder engine, an engine block including two banks of three in-line cylinders each disposed to receive a piston for reciprocating movement, exhaust passage means communicating with each cylinder, a pair of generally parallel exhaust chambers each communicating with the exhaust passage means of one of said banks of cylinders, a tubular valve member mounted for rotation in each exhaust chamber and each tubular member having a plurality of apertures constructed and arranged to be moved into and out of registry with the respective exhaust passage means, operating means for rotating each tubular valve member from a substantially closed position at low engine speed where said apertures are substantially out of registry with the respective exhaust passage means to an open position at high speed where said apertures are in full registry with the respective exhaust passage means, the interiors of said tubular valve members constituting conduits for the discharge of exhaust gas from said exhaust passage means.

11. The engine of claim 10, wherein said block has exhaust conduit means communicating with the interiors of said valve members.

12. The engine of claim 10, and including adjusting means for simultaneously adjusting the position of said valve members when in the closed position.

13. The engine of claim 10, including connecting means for interconnecting said valve members, said connecting means being constructed and arranged to rotate said valve members in unison from said closed position to said open position.

14. The engine of claim 12, wherein said connecting means comprises a gear segment connected to each valve member, said gear segments being disposed in meshing engagement, throttle means for controlling the speed of the engine, and linkage means interconnecting the throttle means and one of said gear segments whereby movement of said throttle means will operate to rotate said valve members.

15. The engine of claim 9, and including biasing means for urging each valve member to the closed position.

* * * * *